US008554246B2

(12) United States Patent
Boyer et al.

(10) Patent No.: US 8,554,246 B2
(45) Date of Patent: Oct. 8, 2013

(54) COMBINATION OF MULTIPLE BASELINES FOR LOCATION ESTIMATION

(75) Inventors: Pete A. Boyer, Chesterbrook, PA (US); Rashidus S. Mia, Phoenixville, PA (US); Matthew L Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 97 days.

(21) Appl. No.: 13/301,640

(22) Filed: Nov. 21, 2011

(65) Prior Publication Data

US 2013/0130710 A1    May 23, 2013

(51) Int. Cl.
G01S 3/16 (2006.01)
G01S 3/02 (2006.01)

(52) U.S. Cl.
USPC .......................... 455/456.1; 342/450; 342/378

(58) Field of Classification Search
USPC .............. 342/378, 457, 463; 455/11.1, 67.11, 455/456
See application file for complete search history.

(56) References Cited

U.S. PATENT DOCUMENTS

| 6,097,336 | A | 8/2000 | Stilp |
| 6,097,959 | A * | 8/2000 | Yost et al. .................. 455/456.2 |
| 6,334,059 | B1 | 12/2001 | Stilp et al. |
| 6,603,428 | B2 | 8/2003 | Stilp |
| 6,756,940 | B2 | 6/2004 | Oh et al. |
| 6,842,715 | B1 | 1/2005 | Gaal |
| 6,873,290 | B2 | 3/2005 | Anderson et al. |
| 7,095,368 | B1 | 8/2006 | van Diggelen |
| 7,956,808 | B2 | 6/2011 | Boyer et al. |
| 2002/0177435 | A1 * | 11/2002 | Jenkins et al. ................ 455/412 |
| 2004/0087269 | A1 | 5/2004 | Edge et al. |
| 2005/0116823 | A1 * | 6/2005 | Paulsen et al. ........... 340/539.13 |
| 2008/0188242 | A1 | 8/2008 | Carlson et al. |
| 2009/0005061 | A1 | 1/2009 | Ward et al. |
| 2009/0146881 | A1 | 6/2009 | Mesecher |

FOREIGN PATENT DOCUMENTS

EP    1030531 A1    8/2000

* cited by examiner

Primary Examiner — Nizar Sivji
(74) Attorney, Agent, or Firm — Woodcock Washburn LLP

(57) ABSTRACT

A method for combining a plurality of individual location measurements, for use in a wireless location system, includes the following steps. A quality metric for a single location estimate is computed along with individual quality metrics and individual weightings for each individual location measurement. In addition, weighting operations incorporating a quality metric for a single location are performed, and the measurement weights are adjusted based on information about co-location groups; and a decision metric and common bias accounting for multiple reference measurements are computed.

29 Claims, 17 Drawing Sheets

COMBINATION OF MULTIPLE BASELINES FOR LOCATION ESTIMATION

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to a method for increasing the accuracy of location estimates produced by a network-based wireless location system

BACKGROUND

Early work relating to network-based Wireless Location Systems (WLS) is described in U.S. Pat. No. 4,728,959; "Direction Finding Localization System" (issued Mar. 1, 1998) which discloses a system for locating cellular telephones using angle of arrival (AOA) techniques and U.S. Pat. No. 5,327,144, (Issued Jul. 5, 1994) "Cellular Telephone Location System," which discloses a system for locating cellular telephones using time difference of arrival (TDOA) techniques. Further enhancements of the system disclosed in the '144 patent are disclosed in U.S. Pat. No. 5,608,410, (Issued Mar. 4, 1997), "System for Locating a Source of Bursty Transmissions". Location estimation techniques for wide-band wireless communications systems were further developed in U.S. Pat. No. 6,047,192 (Issued Apr. 4, 200), "Robust, Efficient Localization System".

All of these patents are assigned to TruePosition, Inc., the assignee of the present invention. TruePosition has continued to develop significant enhancements to the original inventive concepts. First commercially deployed in 1998, overlay network-based wireless location systems have been widely deployed in support of location-based services including emergency services location. The use of multiple location calculations for a single location estimate was previously explored in U.S. Pat. No. 6,097,336; "Method for improving the accuracy of a wireless location system", by Stilp, Issued Aug. 1, 2000; U.S. Pat. No. 6,334,059; "Modified transmission method for improving accuracy for e-911 calls" by Stilp et al. Issued Dec. 25, 2001; U.S. Pat. No. 6,603,428; "Multiple pass location processing"; by Stilp, issued Aug. 5, 2003; and U.S. Pat. No. 6,873,290; "Multiple pass location processor", by Anderson et al., issued Mar. 29, 2005.

A U-TDOA location system (and other location systems) location performance is normally expressed as one or more circular error probabilities. The United States Federal Communications Commission (FCC) as part of the 2001 Enhanced 9-1-1 Phase II mandate requires that network-based systems, such as U-TDOA, be deployed to yield a precision that generates a one-hundred meter (100 m or 328.1 feet) accuracy for a yield of 67% of emergency services callers and a three-hundred meter (300 m or 984.25 feet) accuracy for a yield of 95% of emergency services callers. In 2011, the FCC set a new single location accuracy requirement, to be implemented in 2019 for any and all E911 location technologies, to 50 meters for 67% emergency services callers and 150 meters accuracy for 95% of emergency services callers. This legal requirement makes location accuracy (and yield) of paramount importance for wireless location systems. As realized and noted in prior art, the ability to routinely, reliably, and rapidly locate cellular wireless communications devices has the potential to provide significant public benefit in public safety and convenience and in commercial productivity.

The inventive techniques and concepts described herein apply to time and frequency division multiplexed (TDMA/FDMA) radio communications systems including the widely used GSM; the OFDM based LTE, LTE-Advanced wireless systems and WiMAX systems, as well as with code-division radio communications systems such as CDMA (IS-95, IS-2000) and Universal Mobile Telecommunications System (UTMS), the latter of which is also known as W-CDMA.

The 3GPP-defined E-UTRAN (Evolved Universal Mobile Telecommunications System Universal Mobile Telecommunications System Terrestrial Radio Access Network), also known as Long Term Evolution or simply as LTE wireless communications network model and terminology used in this specification is an exemplary but not exclusive environment in which the present invention may be used.

SUMMARY

A method for improving a location estimate by taking a series of signal measurements over a time window to establish a superset of TDOA baselines which can then be correlated and intelligently filtered on the basis of received signal quality to produce a more accurate final location estimate.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
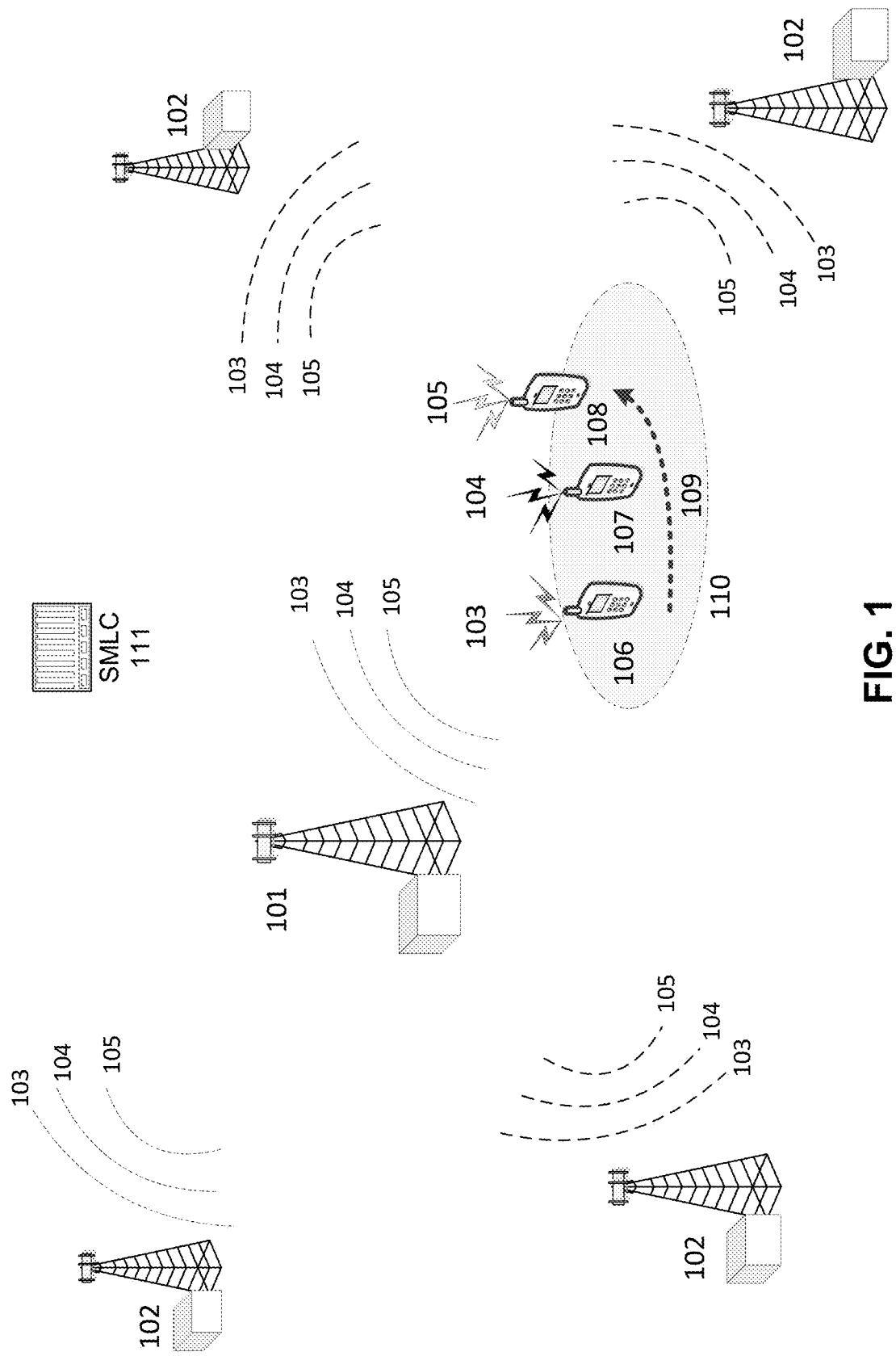
FIG. 1 depicts an exemplary multiple measurement collection using a network-based wireless location system integrated with the wireless communications system.

We will now describe illustrative embodiments of the present invention. First, we provide a detailed overview of the problem and then a more detailed description of our solutions.

A. Uplink TDOA Wireless Location System with Transmission Diversity

In radio communication networks, transmission diversity is used to mitigate the effects of multi-path and reflection signals that arise in Non-Line-of-Sight (NLOS) environment. In a network-based wireless location system with multiple, geographically distributed receivers, transmission diversity is used to determine the time of arrival (TOA) or time-difference-of-arrival (TDOA). Using the available uplink radio signals only, the wireless location system takes a series of signal measurements and does not rely on re-broadcasting of radio signals or multiple simultaneous broadcast transmission antennas as is typical in transmission diversity schemes for radio communications. To achieve transmission diversity for use in a wireless location system, a series of positioning measurements may be executed in order to find a single device's geographical position. When multiple UTDOA measurements exist, they may be combined to eliminate redundancy and improve accuracy. Use of the velocity (obtained from the Frequency-Difference-of-Arrival (FDOA) calculations, historical data or predictions based on the local area) allows priority scheduling and use of multiple signal timing measures from the same transmitter without undue accuracy degradation.

Location Request to Location Report latency is a critical quality of service parameter for location-based services such as emergency services calls (e.g. (9-1-1, 9-9-9, 1-1-2). A time requirement on the initial position estimate prevents the use of longer signal integration lengths in correlation processing which would otherwise improve location accuracy in a more ideal way by obtaining more accurate individual uplink-Time-Difference-of-Arrival (UTDOA) measurements. U.S. Pat. No. 7,924,224 "Variable coherence integration for the location of weak signals", Lefever et al, assigned to TruePosition Inc. teaches one such method for increasing accuracy without delaying the location report.

U-TDOA radio receivers, called Location Measurement Units or LMUs by the $3^{rd}$ Generation Partnership Program (3GPP) standards development organization, are used to collect radio emissions from the mobile device. An example schematic is provided in FIG. 3 for reference. The LMU receiver uses multiple antenna ports to interconnect with external receive antenna. Using the baseline selection method and correlation processing previously taught in U.S. Pat. No. 6,483,460 "Baseline selection method for use in a wireless location system", U.S. Pat. No. 6,876,859; "Method for estimating TDOA and FDOA in a Wireless Location System" and U.S. Pat. No. 7,667,649; "Detection of Time of Arrival of CDMA Signals in a Wireless Communications System", all of which are owned by TruePosition. An overview of the baseline correlation method which a TDOA, TDOA with AoA location can be produced is shown by example in FIG. 4.

When combining multiple signal timing measurements, multiple TDOA baselines may exist for a site, sector and/or individual LMU receiver port. Ideally, the TDOA measurements at the same physical location would not deviate from each other significantly after accounting for small differences due to motion. However, since multipath and noise cause deviations from the ideal case, the knowledge that the TDOA measurements should be the same may be exploited by additional processing as in U.S. Pat. No. 7,956,808, "Method for position estimation using generalized error distributions" Boyer et al.

When attempting multiple U-TDOA measurements over a time period, the radio environment can change dramatically due to environmental changes and movement of the mobile device. Since radio conditions change dynamically, different LMU measurement ports may be used as the reference for the UTDOA measurements.

Moreover, redundant baselines from the same port will preferably be combined in a way that decreases the importance of baselines with lower degrees of confidence and increases the importance of baselines with higher degrees of confidence. Lastly, metrics that indicate the quality of the location such as a baseline offset and confidence radius for the individual location estimates in the series become available for discriminating between redundant baselines and may be combined with other available, databased information. This invention provides a method for combining multiple UTDOA measurement to improve reported accuracy in network-based radio location systems.

An example of the accuracy improvement using the present invention is illustrated in the Table 1. Three repeated sets of TDOA measurement are made at over 4000 known locations using a commercial TruePosition® Wireless Location System. This real field data was then post-processed to determine the location performance. Table 1 shows performance improvement over the location error distribution. The first column shows the percentile of the location error distribution. The second column shows the improvement for each percentile using multiple (3 in this example) TDOA measurements instead of a single TDOA measurement.

TABLE 1

Sample accuracy improvements for the TDOA embodiment.

| percentile | Location Improvement (%) |
|---|---|
| 10.00 | 0.08 |
| 20.00 | 3.31 |
| 30.00 | 4.49 |
| 40.00 | 5.31 |
| 50.00 | 6.38 |
| 60.00 | 10.04 |
| 67.00 | 12.69 |
| 70.00 | 15.27 |
| 80.00 | 13.50 |
| 90.00 | 16.00 |

FIG. 1

FIG. 1 is used to illustrate the collection of multiple snapshots of radio energy from a single mobile for the purposes of Time-Difference-of-Arrival, Angle-of-Arrival and/or hybrid TDOA AOA based location estimate.

In a geographic area served by a wireless communication network (WCN) equipped an overlaid or integrated wireless location system (WLS), a mobile device is to be located. The Serving Mobile Location Center (SMLC) 111 coordinates the selection, scheduling and data transmissions of the Location Measurement Units (LMUs) via wired or wireless data connections (data connections not shown as to unclutter the image). The SMLC 111 and geographically distributed LMUs comprise the WLS.

The WCN and WLC are shown here as a serving cell 101 and neighboring or geographically proximate cells 102 equipped with Location Measurement Units (LMUs). In Radio Access Networks (RAN) with soft-handoff, the serving cell is that from whose broadcasts which the mobile device determines timing. The serving cell 101 and proximate cells 102 are depicted here as classic tower-based cell sites only for the purposes of illustration and not to limit the present invention. LMUs can also be deployed as standalone units (with appropriate receiver antenna) or integrated into the hardware and/or software of the base stations 101 102.

In FIG. 1, the mobile device is shown as moving 109 and three sequential collections 106 107 108 are scheduled to limit the location error area 110 associated with movement. The LMUs collect mobile device originated radio energy emissions 103 104 105 from the collections 106 107 108 and develop time-difference-of-arrival and related data which is forwarded to the SMLC 111 for combination into a final location estimate.

Figure 2A:
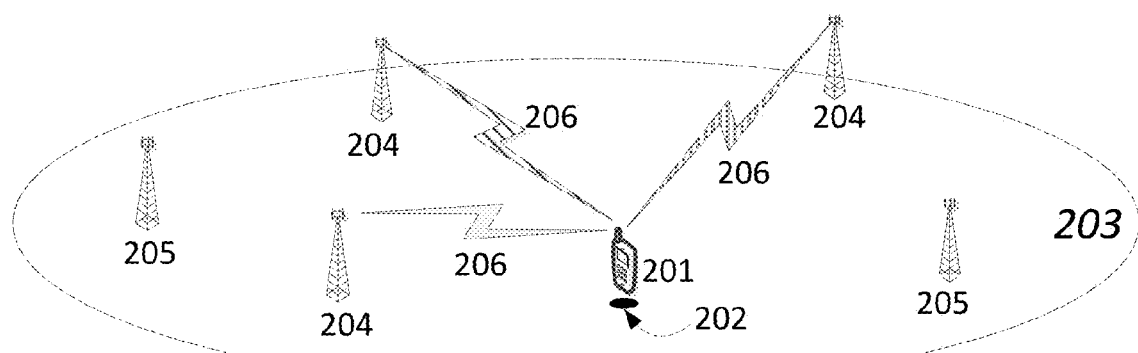
FIGS. 2a, 2b, and 2c illustrate the multiple measurement collection in a multipath radio frequency environment.
Figure 2B:
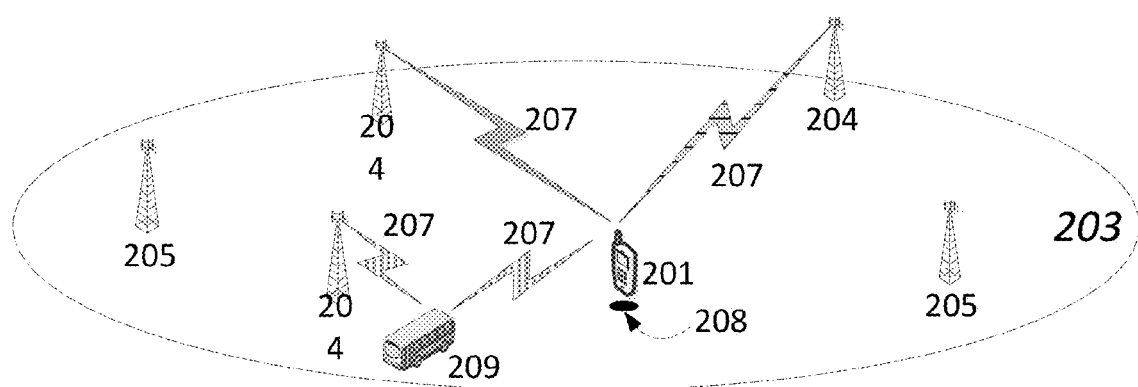
Figure 2C:
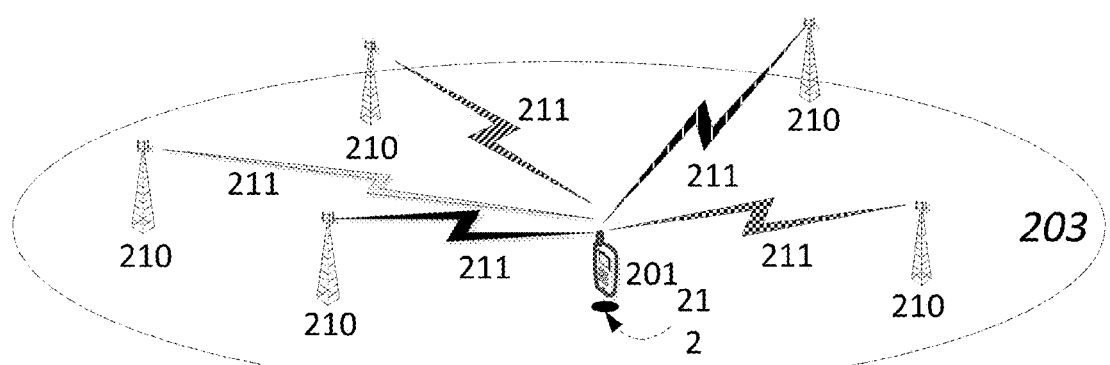

FIGS. 2a 2b and 2c

FIGS. 2a, 2b and 2c serve to illustrate a multiple collection location event where the number of collections equals 3 (n=3). In each of 2a, 2b and 2c, the same mobile station 202 is broadcasting a signal (either on a control, access, voice or data channel) and the wireless location system has been informed of the channel allotment (e.g. frequency, hop pattern, codes, resource block allocation, timeslots(s), serving cell, serving sector, etc.) allowing the LMU to receive the transmission. Scheduling of the collection periods may be dependent on the transmission event (control events and certain packet data transmissions may be quite short, requiring a tightly constrained, sequential collection series while some services such as voice, data and video may allow non-sequential collections over a longer time period), mobile velocity (either the location of the serving cell/sector in an area with fast movers (e.g. a highway in the serving sector or the FDOA result of the first collection showing a high velocity can be used to select the collection sequence scheduling) or predictive modeling (which can include historical data) of the geographic service area.

Note that the radio signal transmitted in FIGS. 2a, 2b, and 2c is arbitrary and only constrained by the transmission scheme (TDMA, TDMA/FDMA, OFDM) and interoperability standard used by the radio access network. Unlike in communications systems that use transmission diversity techniques for improved communications performance, repetition of the same broadcast is not required for location. Although in each collection time, a single radio signal is being transmitted by the mobile device, a unique signal is being received at each LMU receiver port due to signal corruption from attenuation, constructive and destructive self-interference, co-channel interference, adjacent channel interference, radio reflection, radio refraction, and phase shifting of the signal.

FIG. 2a

FIG. 2a shows an example of a first collection of radio emissions 206 for a mobile device 201 by a LMUs 204 205 in a service area 203. In this first collection, only three LMUs 204 in the service area 203 receive a useful radio signal 206. Some LMUs 205 in the service area 203 do not receive a usable signal or are not selected to be part of the signal collection. The position of the mobile device 201 in the service area 203 is then calculated and the result stored at the local SMLC for future processing.

FIG. 2b

FIG. 2b depicts an example of a second collection of radio emissions 207 from a mobile device 201 by a LMUs 204 205 in a service area 203. In this second collection, the same three LMUs 204 in the service area 203 receive a radio signal 207. The position 208 of the mobile device 211 in the service area 203 is then calculated and transmitted to the local SMLC for future processing.

Although the same LMUs 204 are involved in the location, the second received radio signal 207 has been subjected to different attenuation, reflection, and refraction than the first received radio signal 206 and the mobile's position 208 may have changed from the first position 202 as depicted in FIG. 2a. The surrounding radio environment may also change, for example with the introduction (or movement) of a radio reflector 209 not present in the first signal collection. Each receiving LMU 204 may also be receiving the radio signal 207 on different receiver ports as the connected antenna array may receive the radio signal 207 on different antenna than in the first collection.

FIG. 2c

FIG. 2c illustrates an example of a third or subsequent collection of radio emissions 210 mobile device location. In this collection, a different set of LMUs 210 in the service area 203 receive a radio signal 211 versus the original LMUs 204 as was the case in the first (FIG. 2a) and second (FIG. 2b) examples.

The position 212 of the mobile device 201 in the service area 203 is then calculated at the local SMLC using the developed timing and radio signal characteristics collected in the multiple location series. In cases where directional antennas (e.g. a phased array) are available, angle-of-arrival may also be used in the final location estimation.

FIG. 3

Figure 3:
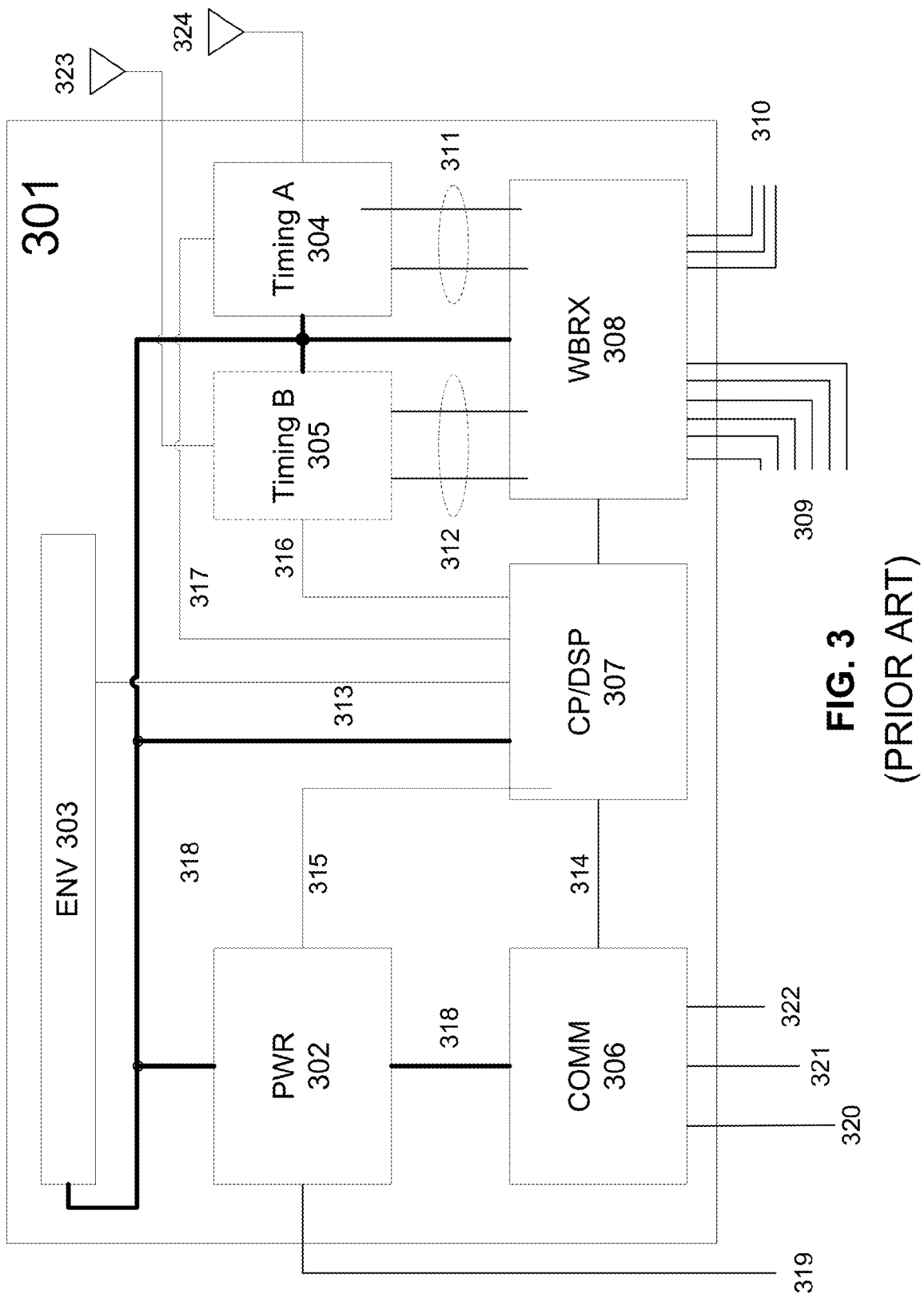
FIG. 3 illustrates the functional components of a location measurement unit.

FIG. 3 schematically depicts the major functional subsystems and interconnections of an exemplary LMU. The LMU is itself a functional entity and may be combined into the software and circuitry of another device, such as the radio base station of a wireless communications network. Depicted here as a standalone device for the purposes of clarity, the LMU 301 contains a power subsystem 302 that conditions input power 319 and the distributes power 318 and monitors the power conditions of the other subsystems.

The Power (PWR) subsystem 302 communicates with the SMLC or OMC via packet connections 315 to the Communications Subsystem (COMM) subsystem 306 via the CP/DSP 307.

The LMU environmental subsystem 303 provides cooling as well as environmental and intrusion alarming.

The Timing subsystem 304 uses broadcast radio signals collected by an antenna 324 to provide internal LMU timing and inter-LMU timing synchronization. A secondary, optional, timing subsystem 305 provides backup and holdover in case of a failure of the primary timing subsystem 304. The secondary timing subsystem is shown here as served by its own antenna 323. Timing signals are supplied via data connections 317 316 to the CP/DSP subsystem 307 and the data connections 311 312 to the WBRX subsystem 308.

The LMU communications subsystem 306 translates and physically bridges the communications links to the LMU. Currently, the LMU provides duplex links for V.35 format 320, A T1/E1 format 321, and TCP/IP format 322.

The Central Processor/Digital Signal Processor (CP/DSP) subsystem 307 provides the TDOA calculation processing as well as managing the operations of the LMU. The CP/DSP 307 communicates with the SMLC, OMC, or triggering platform via a packet connection 314 with Communications Subsystem 306. The CP/DSP also monitors via a data connection 313 environmental indications and alarms from the environmental system 303.

The Wide Band Receiver (WBRX) 308 is a software-defined receiver (SDR) with input ports for both the uplink (receiver) antenna 309 but also ports for the downlink receiver antenna 310 used for monitoring of nearby cells for signal and timing (See U.S. patent application Ser. No. 11/948,244, "Automated Configuration of a Wireless Location System" for additional detail on the downlink monitoring capabilities of the LMU). The WBRX 308 uses timing and frequency references supplied 311 from the timing subsystem(s) 304 305 for tuning and accurate timestamping.

FIG. 4a

Figure 4A:
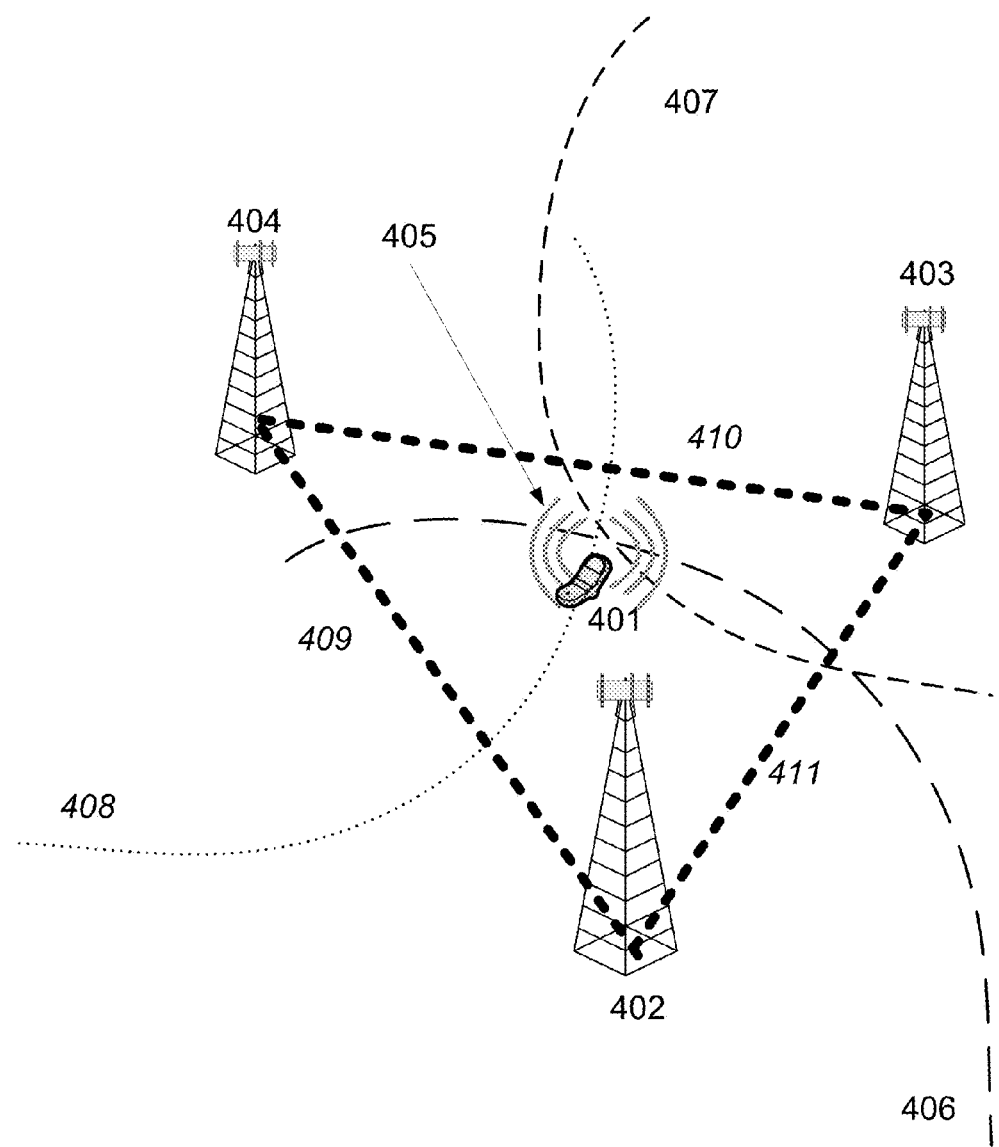
FIG. 4a geographically depicts the baseline measurements method in a wireless location system.

FIG. 4a is used to illustrate the TDOA multi-lateration method used in the present invention. In this example, three cell towers (aka cell sites, Base Stations, Radio Base Stations or Base Transceiver Sites) 402 403 404 with location receivers (e.g. Signal Collection Systems (SCS) or Location Measurement Units (LMUs)) are shown as is the mobile device 401 situated in a geographic space.

During a location attempt, the wireless location system via the cell-site co-located Location Measurement Units (LMUs) (not shown), collect uplink radio transmission signal from the mobile device 401.

The basic uplink time-difference-of-arrival method involves a multi-lateration calculation. The mobile device 401 transmitted radio signal 405 arrives at different times at two different receivers. Each pair of receivers forms a baseline path, for instance, receivers A-B have a baseline 409, receivers B-C have a baseline 410 and receivers A-C have a baseline 411. For each baseline path, the WLS derive a hyperbolic line (an isochron) 406 407 408 from the time difference of arrival between receivers pairs. The intersection of at least 3 such lines determines the unambiguous position of the transmitting mobile device 401.

Since each LMU 402 403 404 has multiple (typically 2 ports are dedicated to a single sector with typical LMUs having 12 or more) receiver ports allowing connection of 2n receiver antenna, more than a single baseline can be established between each LMU. In the present invention, each LMU port can be viewed as an independent receiver with a baseline possible to any other LMU's receiver ports deployed in the same geographic service area.

Since each LMU 402 403 404 has multiple (typically 2 ports are dedicated to a single sector with higher capacity LMUs having 12 or more) receiver ports allowing connection of 2n receiver antenna, more than a single baseline can be established between each LMU. In the present invention, each LMU port can be viewed as an independent receiver with a baseline possible to any other LMU's receiver ports deployed in the same geographic service area. In prior art, only one LMU receiver port is used as a reference port for all of the other receiver ports on all LMUs involved in the single collection event. In the present invention, sets of baselines are collected at different times and the reference port may be different at the different collection times. The present invention accounts for multiple reference ports over multiple collections when determining a position estimate.

Saved Information from Each TDOA Measurement and Estimation

In the present invention, a set of 'residual values" are generated during each signal collection and then saved for later use. These residuals can be for TDOA, TOA, AoA and FDOA. Using TDOA as an example, for each collection event a TDOA location is determined from the collected signals. Residuals are then calculated for each TDOA baseline based on the closest approach of the baseline's isochron to the calculated TDOA location (the root mean square (RMS) of the smallest offset). For instance, a isochron that crosses the calculated location would have a residual value of "0". Similarly velocity (speed and bearing) are calculated from the Doppler shift determined from the FDOA isochrones each associated with a baseline pair of the collected signals.

FIG. 4b

Figure 4B:
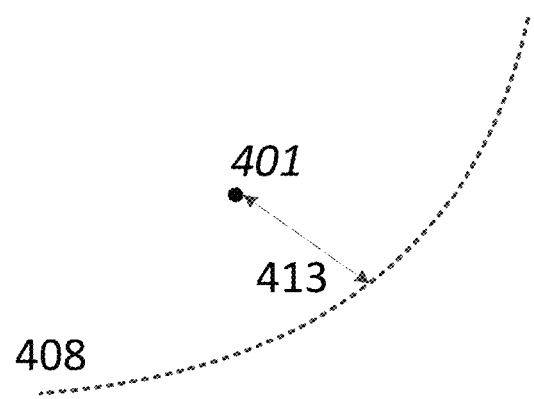
FIG. 4b geographically depicts the residual error value calculation for TDOA.

FIG. 4b geographically illustrates the residual value calculation. For a TDOA hyperbolic isochron arc 401 calculated using the baseline correlation method, the smallest distance 413 between the calculated mobile device location 401 for the collection event is determined The RMS value of this distance 413 is then the residual value for the baseline in the final TDOA calculation.

FIG. 5

Figure 5:
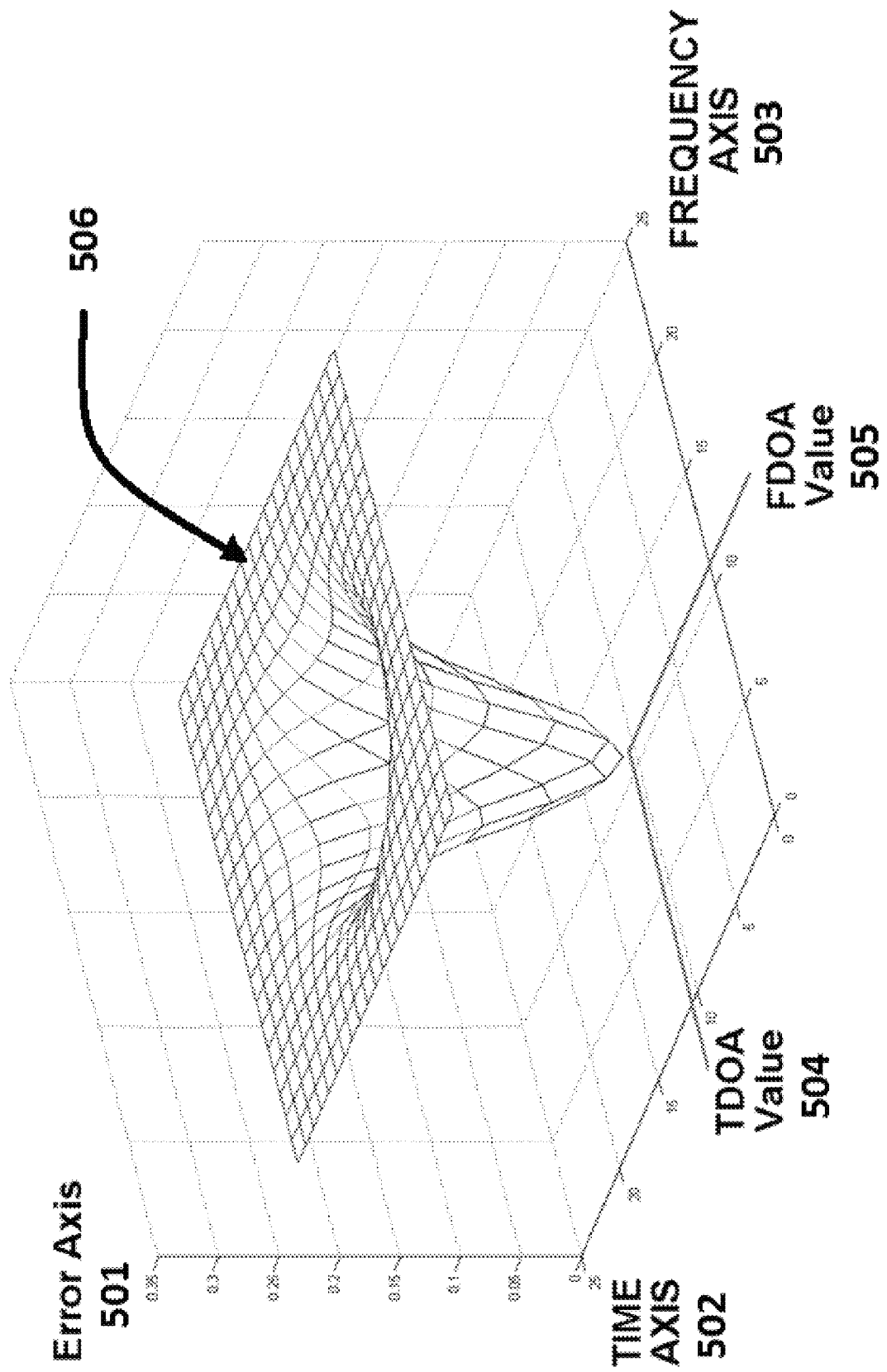
FIG. 5 graphically depicts the calculation of TDOA and FDOA values from error minimization.

FIG. 5 graphically depicts the calculation of a TDOA and FDOA measurement using the CML procedure. The X axis is the Time Axis 502, the Y Axis is the Frequency Offset Axis 503 and the Z axis 501 is the Error Axis.

For each single location estimate, an location error estimate, a TDOA estimate and a FDOA estimate is produced via correlation with the reference signal. Combining multiple single measurements results in an error surface 506. For the purposes of illustration, the error surface in FIG. 5 shows the error surface 506 comprised of thousands of measurements. Fewer measurements will produce a much more disorganized surface. Greater detail on an operative method for a single TDOA/FDOA calculation can be found in TruePosition's U.S. Pat. No. 7,956,808 "METHOD FOR POSITION ESTIMATION USING GENERALIZED ERROR DISTRIBUTIONS".

Using the error surface 506, the minima in the error establishes the maximum likely Time-Difference-of-Arrival (TDOA) 504 and Frequency-Difference-of Arrival (FDOA) 505. For each collection event the computed location is used to determine residual values for each baseline and is retained for use in calculating the final position.

B. Combining Multiple Locations (CML)

FIG. 6

Figure 6:
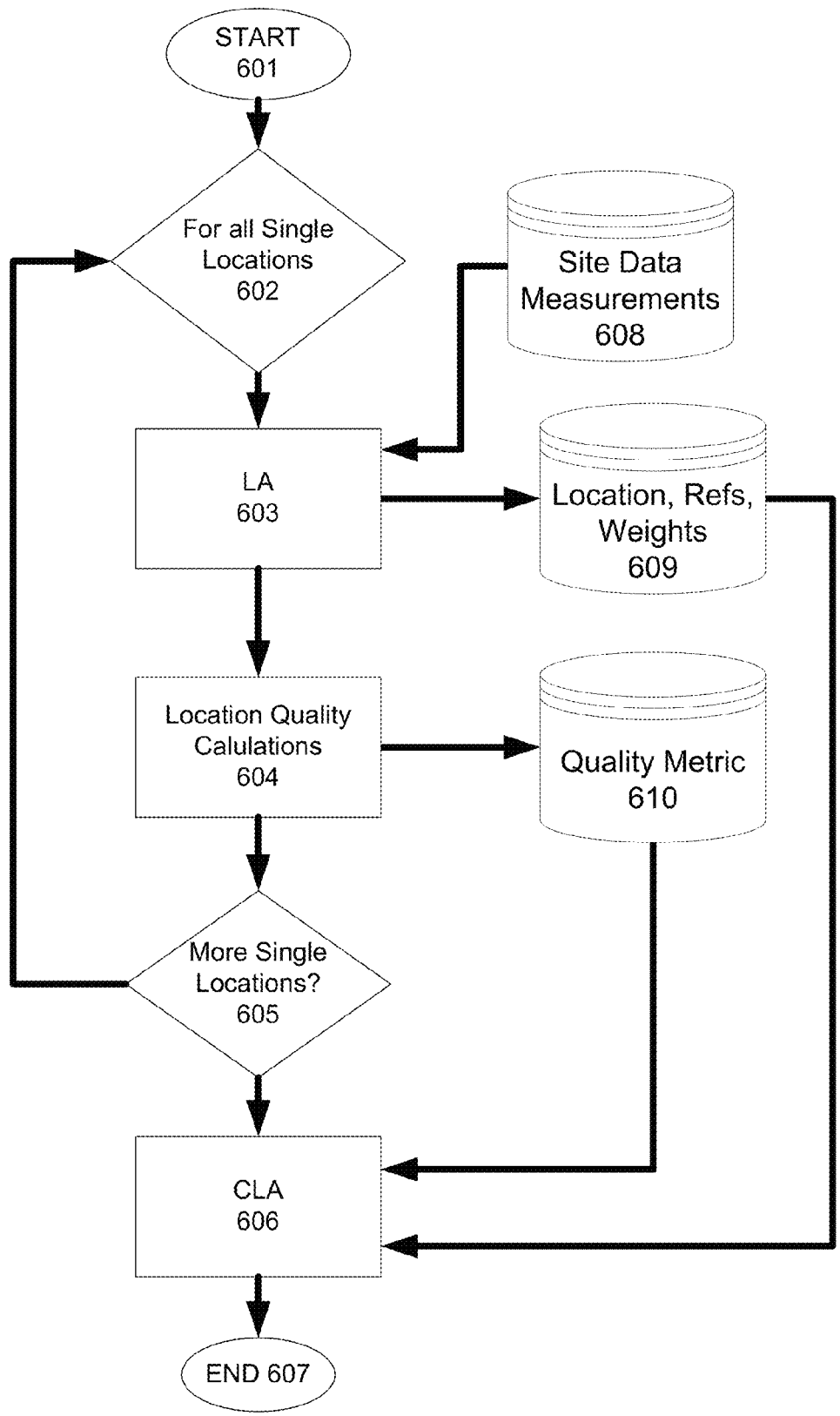
FIG. 6 details the procedure for location calculation using multiple measurements.

FIG. 6 shows the procedure for CML. The procedure starts 601 when the mobile device accesses the wireless communications network via a transmission on a control and/or traffic/data channel. The location triggering platform provides a position request with the serving cell(s), channel assignment and related radio tuning information to the Serving Mobile Location Center (SMLC). The location triggering platform can be the integrated into a component (or multiple components) of the Radio Access Network (e.g. the BSC, MSC, MME), or added to the RAN as an independent passive monitor. Details of passive triggering platforms, both control-plane and user plane based, can be found in TruePosition U.S. Pat. No. 7,167,713 "Monitoring of call information in a wireless location system", U.S. Pat. No. 6,782,264; "Monitoring of call information in a wireless location system", U.S. patent application Ser. No. 11/150,414; "Advanced triggers for location-based service applications in a wireless location system", and U.S. patent application Ser. No. 11/533,310; "USER PLANE UPLINK TIME DIFFERENCE OF ARRIVAL (U-TDOA)".

Once triggering and tasking information is available, the SMLC then makes the decision on engaging the CML procedure and the number of collections, the duration of the collection periods and the scheduling of the collection periods.

Once engaged, the CML procedure, for each location request, generates multiple single locations 602 using a location algorithm (LA) 603 performs all steps necessary to estimate the location. In doing so, a site measurement database 608 is accessed to obtain data such as site locations, sector configurations and antenna information. Initial TDOA measurements and correlation values are also provided to the location algorithm. Location information processed by the location algorithm is stored in a database 609 for use by a combined location algorithm (CLA) 606. This information includes any improvements in the TDOA, weightings of the measurements and the TDOA reference sector used to make a preliminary location decision. The location algorithm provides a location and all other pertinent location information to a quality metric (QM) component 604. The QM is a database record containing the computed location, the computed velocity, confidence factor for location, the confidence factor for velocity, the number of baselines, the TDOA residual value for each baseline, and the FDOA residual for each baseline. The quality metric is computed and stored in a database 610 for use by the CLA 606. Once all multiple single location estimates are made 605, the combined location algorithm 606 is executed to compute an improved location estimate using the information stored during the process of making the series of single location estimates.

C. Single Location Algorithm (LA)

FIG. 7

Figure 7:
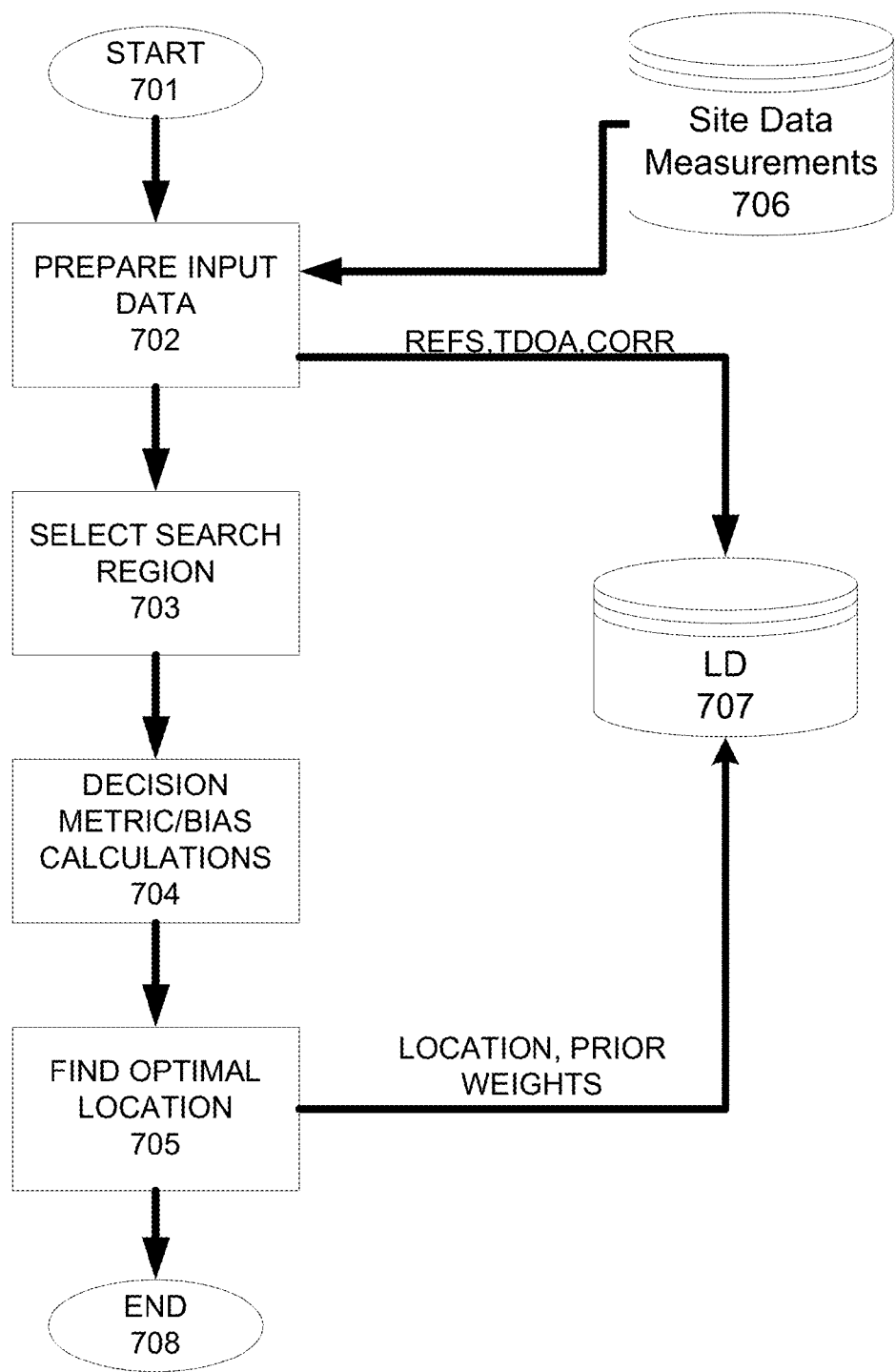
FIG. 7 illustrates the exemplary Location Algorithm for a single location event.

FIG. 7 is used to detail the Location Algorithm (LA) introduced in FIG. 5. Once the tasking and triggering information is delivered to the SMLC, the LA can be started 701.

Using the single Location Algorithm (LA), measurement data and site information 706 is processed during the "prepare input data" stage 702. At this stage, any modifications to the input data are stored in the LB database 707. Modifications to the input data can include corrections to the TDOA measurements. During the input data preparation 702, an initial weighting of each measurement is computed. The input data is then used to select a search region 703 where the location will be determined. It should be noted that it is valuable to have the search region as small as possible without impacting accuracy for computation efficiency. The search region is then provided to the decision metric calculation and bias calculation stage 704. Note that any common bias on the measurements may be corrected to improve the accuracy of a location estimate. At this stage 704, a decision metric is computed at each potential location along with the bias. Additionally, during this stage the initial weighting may be changed to further improve accuracy. In the last stage, an optimal location 705 is found using the decision metric. The estimated location along with the potentially modified weights are then stored 707 for use by the combined location algorithm thus ending the LA procedure 708.

D. Combined Location Algorithm (CLA)

The combined location Algorithm uses the stored signal information from each collection event to determine the most optimal location.

FIG. 8

Figure 8:
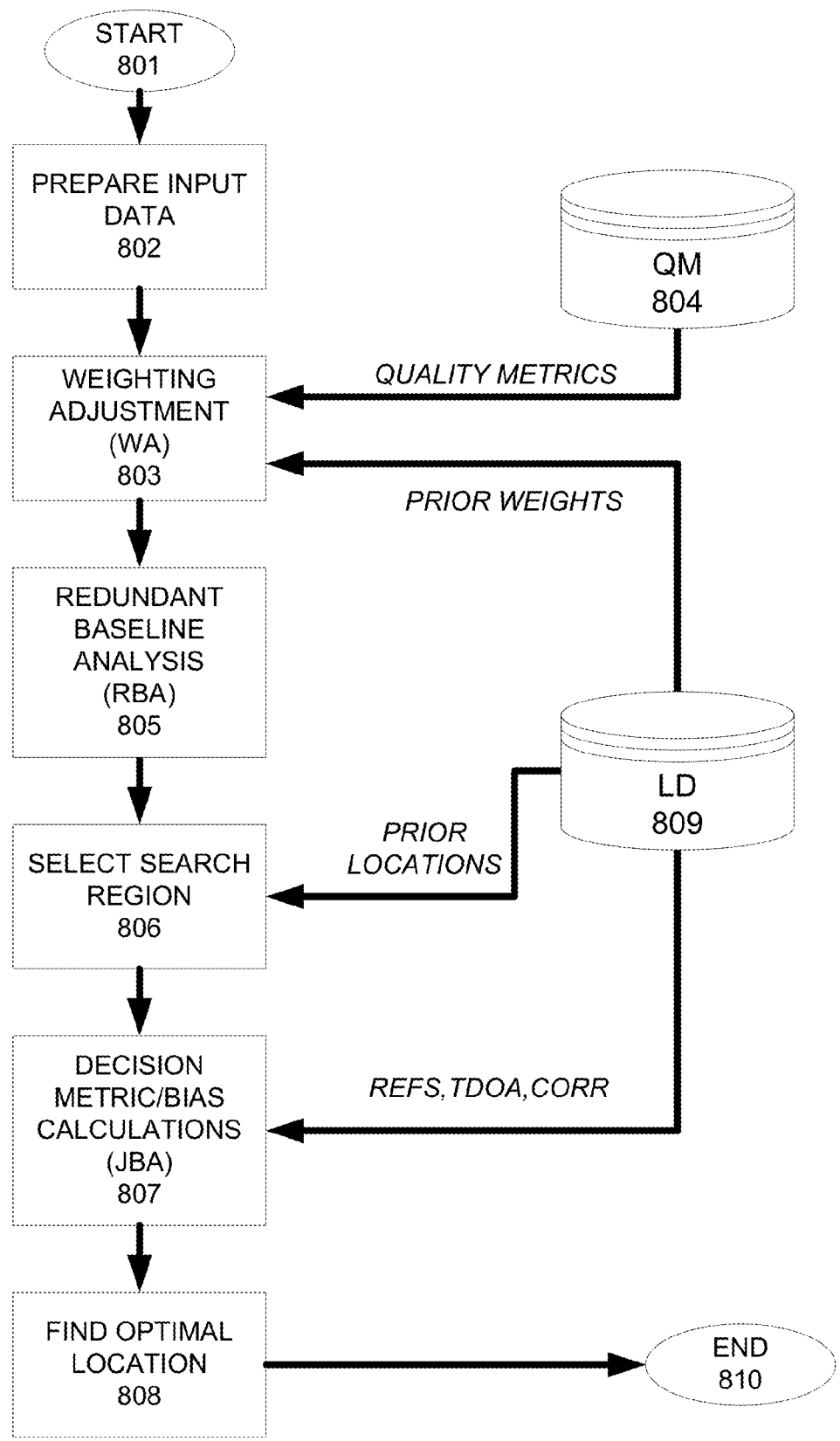
FIG. 8 details the combined location algorithm procedure.

The logical flow of the combined location algorithm for the preferred embodiment is shown in FIG. 8. The steps are similar to those in the single location algorithm (LA); However, once the CLA procedure is entered 801, additional processing is performed after the data input preparation stage 802. The previously computed quality metrics from the QM database 804 and prior weights from the LD database 809 are used to adjust the initial weights in a weighting adjustment (WA) step 803 described in detail in FIG. 9. Then, a reweighting and filtering operation is performed in a redundant baseline analysis (RBA) 805. The RBA operation is described in detail in FIG. 10. Next, a search region is selected 806 using both the location of all cooperating sites and the prior locations previously stored in the LD database 809. Narrowing the geographic search region serves to eliminate the need for unnecessary processing (see TruePosition-assigned U.S. patent "Method for estimating TDOA and FDOA in a wireless location system" by Anderson for additional detail on constraining of the TDOA and FDOA searches). A decision metric is computed 807 throughout the search region and multiple references are handled using the joint bias analysis (JBA) logic. The JBA operation is described in FIG. 12. Finally, the combined location estimate is found from the decision metric computations 808. The CLA procedure ends 810 with the optimized location being reported in the response message to the original location request message sent to the WLS.

In an alternate embodiment, the CLA may simply pick one of the single solutions from the location database (LD) 809. In this embodiment, the logic of CLA in FIG. 8 would reduce to simply picking the prior location solution that has the best quality as determined based on the quality metric. This approach reduces computational complexity at the cost of accuracy.

Figure 10:
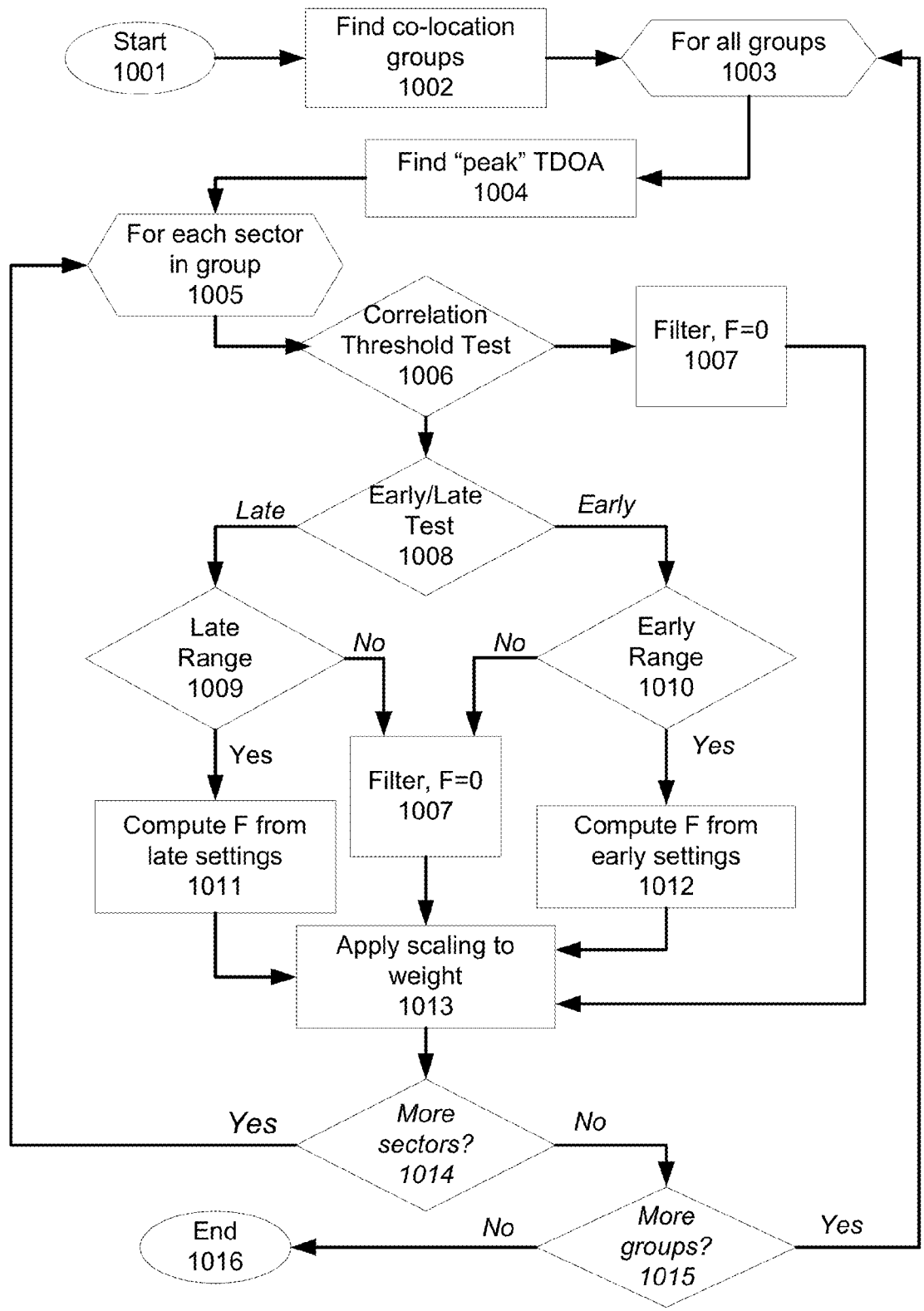
FIG. 10 shows the exemplary procedure for redundant baseline analysis.

In an alternate embodiment when there is only one location available from the multiple signal collection events, the WA step 803 in CLA FIG. 8 is removed. The RBA step 805 provides additional benefit over using a generic location algorithm. For this special case, the CLA algorithm reduces to the LA (as shown in FIG. 7) plus the RBA processing (as shown in FIG. 10). In the RBA processing a single reference is used and the TDOA measurement weighting from the generic location algorithm (LA) provides the input.

E. Weighting Adjustment

An overall quality metric for the single location provides additional weighting information for the TDOA measurements used in the combined location algorithm. Prior to the downweighting of the redundant baselines, an additional weighting operation is performed using the quality metric. The quality metrics are used to scale the original weight by the deviation of the quality metric from the minimum quality metric. The final weights are then scaled to ensure that there is no change in the sum of the weights when compared with the original weights.

FIG. 9

Figure 9:
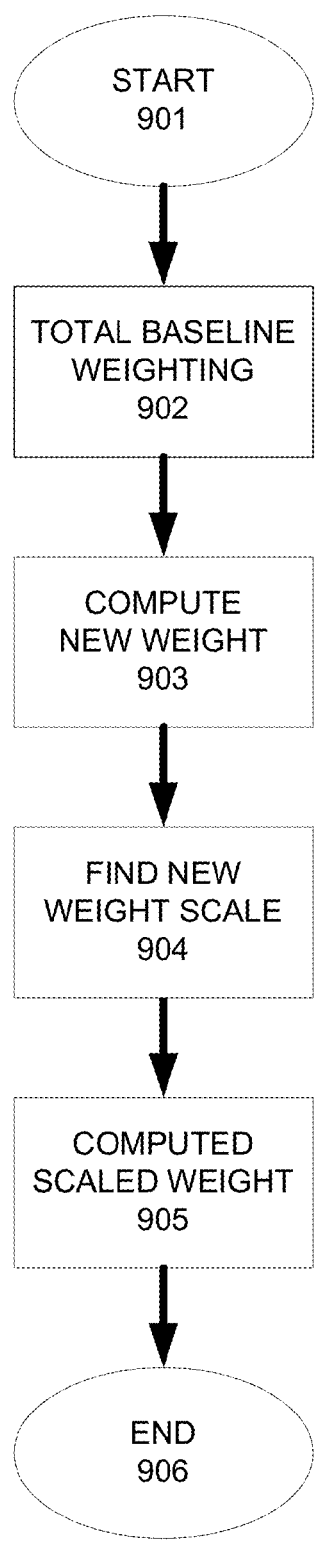
FIG. 9 depicts the Weighting Adjustment (WA) function.

The weighting of the correlation signal using the quality metric is computed as shown in FIG. 9. Once the Weighting Adjustment (WA) function is entered 901, the total weighting of all measurements is computed 902 using the following formula:

$$S_W = \sum_{j=1}^{N_L} \sum_{i=1}^{N_j} W_{ij} \qquad (4)$$

$N_L$ is the number of locations
$N_j$ is the number of cooperators for the jth location
$W_{ij}$ is the weight of the ith measurement having reference j A modified weight is then computed 903 using the quality metric as:

$$W'_{ij} = W_{ij} \Delta Q_j \qquad (5)$$

where,
$\Delta Q_i = Q_{max} - Q_i$
$Q_{max}$ is a maximum limit on the quality metric This gives a higher weight to the locations with a larger quality metric. A new scaled weight is then computed 904 for final normalization as:

$$S'_W = \sum_{j=1}^{N_L} \sum_{i=1}^{N_j} W'_{ij} \tag{6}$$

Lastly, the final weight is then scaled 905 as $$W''_{ij} = \frac{S_W}{S'_W} W'_{ij} \tag{7}$$

The scaling ensures that the sum of the new weights is equal to the sum of the original weights. This in turn ensures the proper operation of any absolute thresholds on weights in the LA or CLA. After this final scaling, the WA procedure ends 906.

F. Redundant Baseline Analysis (RBA)

When combining multiple locations, multiple baselines may exist for a site, sector and/or individual port. Ideally, the TDOA measurements at the same physical location would not deviate from each other significantly after accounting for small differences due to motion. However, since multipath and noise cause deviations from the ideal case, the knowledge that the TDOA measurements should be the same may be exploited by additional processing.

This additional knowledge is used to eliminate and downweight redundant baselines. Multiple early and late thresholds are applied to empirically obtain a zero weighting point for the redundant TDOAs. The TDOAs are then modified based on the deviation of the TDOA correlations from the peak correlation across the multiple baselines. A correlation deviation window around the peak correlation is used to determine a leading edge, i.e. the earliest arriving signal component. Once a leading edge TDOA is found over a subset of the baselines, the remaining baselines are then downweighted to be zero at predetermined early/late thresholds. Optimal settings for this weighting power, the window of deviation from the peak correlation and the early/late thresholds are found by grouping TDOAs that are co-located at the same site.

FIG. 10

The flowchart of FIG. 10 shows the procedure for the Redundant Baseline Analysis (RBA). The figure shows how the weights that were computed by the weighting adjustment (WA) with the quality metric are then reduced by a downweighting factor.

Once the Redundant baseline Analysis procedure is started 1001, the measurements are grouped into co-location groupings where there is one co-location group for all sectors at the same location that have the same reference sector 1002. Once these groupings are created, a group is selected 1003 and the peak correlation value, $\tau_{peak}$, for that group is determined 1004.

Next, for each sector in a geographical region 1005 the downweighting factor is computed and applied to the existing weight. A multi-part test is performed to see if one of the following conditions is met so that the correct downweighting can be applied.

The First Test 1006 detects low correlation ($\rho < \rho_{max} - \Delta\rho$). If the correlation is too low to be reliable relative to the peak correlation, then the measurement gets filtered by setting F to zero 1007 and other filters 1008 1009 1010 are bypassed.

The second test 1008 determines the components of the current TDOA group are early or late based on the time position relative to the component with the peak correlation value. The early and the late subgroups are then tested separately.

The late components are tested against the empirically determined, but pre-set, late threshold 1009. The late TDOA components found too late ($\tau > \tau_{peak} + T_L$) are filtered out 1007 with F=0. Those late TDOA components within the late threshold are filtered with F computed from the late settings 1011 as in Formula 1 below:

$$F = \left[\frac{F_L - 1}{T_L}(\tau - \tau_{peak}) + 1\right]^{P_L} \tag{1}$$

$$\tau_{peak} < \tau < \tau_{peak} + T_L$$

Where F is the Downweighting Factor,
$F_L$ is the late downweighting Factor
$\tau_{peak}$ is the time associated with the highest correlation value, and
$P_L$ is a shaping parameter that is greater than zero.

The early components are tested against the empirically determined, but pre-set, late threshold 1010. The early TDOA components found too early ($\tau < \tau_{peak} - T_E$) are filtered out 1007 with F=0. Those early TDOA components within the early threshold are filtered with F computed from the early settings. Those late TDOA components within the early threshold are filtered with F computed from the early settings 1012 as in Formula 2 below:

$$F = \left[\frac{1 - F_E}{T_E}(\tau - \tau_{peak}) + 1\right]^{P_E} \tag{2}$$

$$\tau_{peak} - T_E < \tau < \tau_{peak}$$

Where F is the Downweighting Factor,
$F_E$ is the early downweighting Factor
$\tau_{peak}$ is the time associated with the highest correlation value, and
$P_E$ is a shaping parameter that is greater than zero.

The RBA algorithm independently uses both a set of early parameters ($F_E$, $T_E$, $P_E$) and late parameters ($F_L$, $T_L$, $P_L$) since in practice measurements of the TDOA often result in errors that are asymmetric about the actual (error free) TDOA.

Finally for each sector in the co-location group, the scaling is applied to the existing weight for the ith TDOA measurement using the jth reference sector 1013 as in formula 3 below:

$$W'''_{ij} = F W''_{ij} \tag{3}$$

In the event that there is only a single location available, the RBA algorithm may be performed and $W_u$ is substituted for $W''_{ij}$.

The algorithm then checks for additional sectors in the current co-location group 1014. If additional sectors exist, then the process moves to the next sector 1005. If no additional sectors in the current co-location group exist, then the algorithm checks for additional co-location groups 1015. If no additional groups are found, then the RBA process ends 1016. If additional co-location groups exist, then the next group is iteratively selected 1003.

Figure 11A:
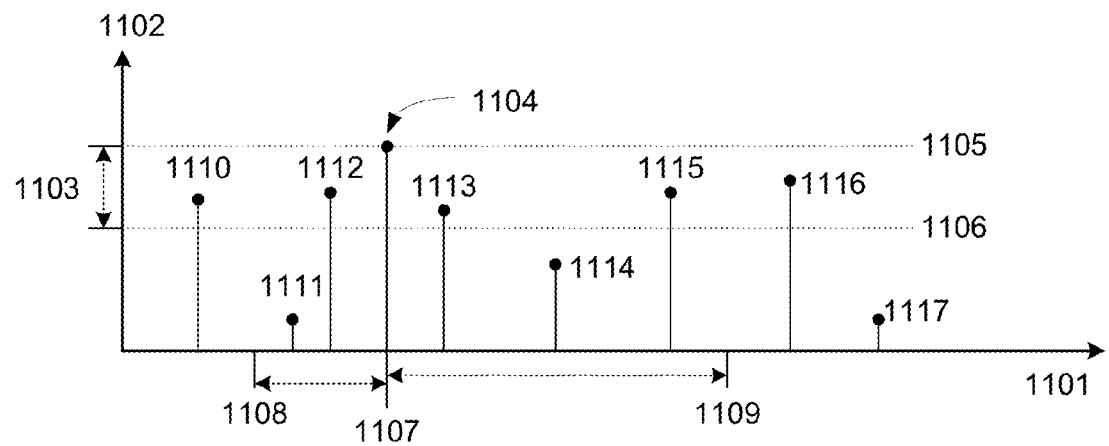
FIG. 11a plots and shows the winnowing of correlation signals from multiple collections.
Figure 11B:
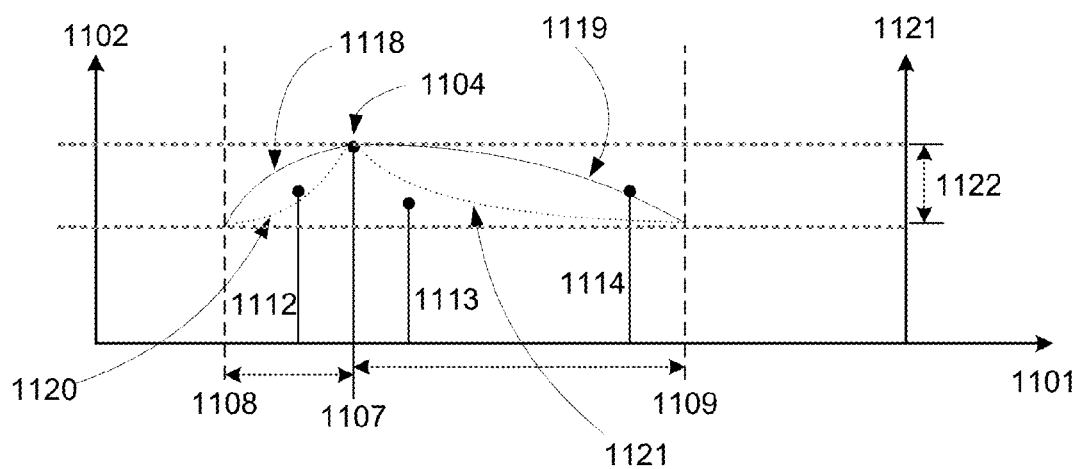
FIG. 11b illustrates the early and late downweighting applied to correlation signals from multiple collections.

FIGS. 11a and 11b

An exemplary algorithm that performs the Redundant Baseline Analysis (RBA) function is graphically depicted in FIGS. 11a and 11b. The number of correlation signals is drastically reduced in these illustrations for the purpose of clarity and in real world calculations the number of baselines, each with a signal, may easily number in the 100's or 1000's.

In this graphic example, the signal with the highest correlation is used in setting both the correlation range and the (early and late) time ranges. In an alternate embodiment, the peak TDOA may be replaced with the mean or median of the TDOAs. In an alternate embodiment, the mean or median may be computed by weighing the TDOAs by their correlation value for determining the peak.

FIG. 11a

FIG. 11a shows the correlation signals 1110 1111 1112 1104 1113 11114 1115 1116 1117 on the Time Axis 1101 with the Correlation Axis 1102. These signals are for a single reference or in the case of multiple references from the multiple collection periods are time shifted to a common bias. All correlation signals from all collection periods are represented here.

The signal with the highest correlation 1104 is found and the time position 1107 noted. The maximum correlation value 1105 for the set is then known and a minimum correlation value 1106 can be applied. Only those signals within the correlation range 1103 between the maximum 1105 and minimum 1106 will be considered for the purposes of location. Additionally, an early threshold 1108 and a last threshold 1109 will be applied based on the time of the maximum correlation signal 1107. Signals outside this range will not be considered for the purposes of location.

FIG. 11b

FIG. 11b serves to illustrate the downweighting applied to the selected correlation signals. The downweighting range is shown 1122. Different downweighting factors apply if the signal is early (before the peak correlation value time 1107) or late (after the peak correlation value time 1107). The late shaping parameter ($P_L$), an empirically determined value greater than 0 with a nominal range between 2 and ½ determines the shaping of the downweighting applied to the early signal(s) 1112. The early shaping parameter ($P_E$), an empirically determined value greater than 0 with a nominal range between 2 and ½ determines the shaping of the downweighting applied to the early signal(s) 1113 1114.

Graphically, the early downweighting with $P_L=2$ is shown 1118. The alternate early downweighting $P_L=½$ is also shown 1120. In the same manner, the late downweighting with $P_E=2$ is shown 1119. The alternate early downweighting $P_L=½$ is also shown 1121.

G. Joint Bias Analysis

For improved performance a method will preferably be provided that combines different TDOA measurements that have been generated using different reference measurements. This requires the identification and optimization of a bias correction over all TDOA measurements. In the present invention, an analytical solution is found for a multidimensional minimization of a maximum likelihood location decision metric.

Figure 12:
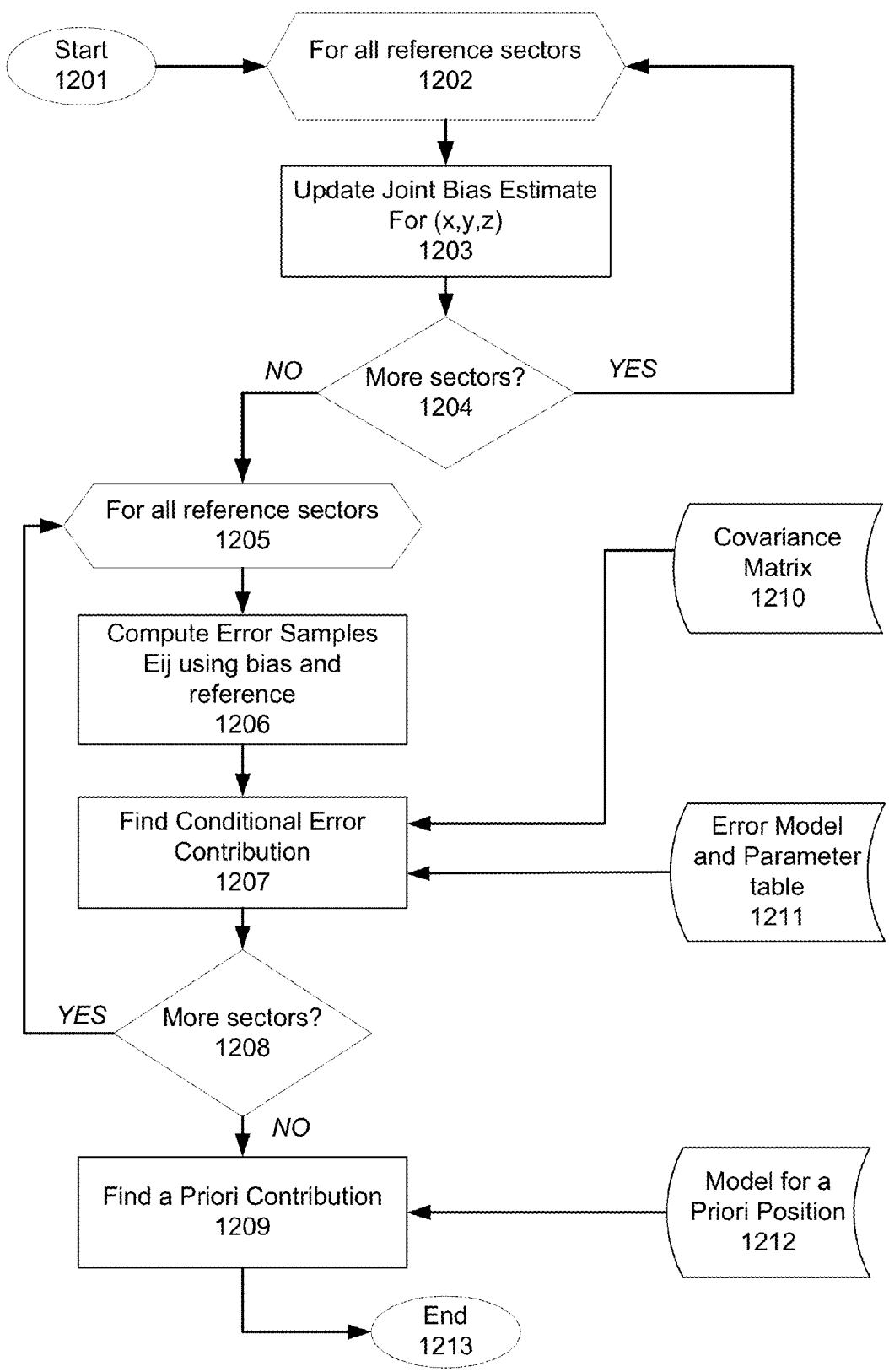
FIG. 12 depicts the calculation of the joint bias when combining multiple measurement events.

FIG. 12 shows the steps involved in the computation of the decision metric and bias at a position x, y, z. First, the bias will preferably be computed prior to performing steps involved with the decision metric computation. A contribution to the bias is computed over all references sectors.

For a multiple references, the bias is found by considering the decision metric that would be optimal for a Gaussian TDOA error distribution. With multiple references, the decision metric is $$M = \sum_{j=1}^{N_R} \sum_{i=1}^{N_j} (E_{ij})^2 W_{ij}''' \qquad (8)$$

where, $N_R$ is the number of reference sectors
$N_j$ is the number of cooperators using the jth reference sector
$E_{ij} \equiv \Delta\tau_{ij} - B_j$ is the error sample
$B_j$ is the bias for the jth reference sector
$\Delta\tau_{ij} = \hat{\tau}_{ij} - (\tau_i(x, y, z) - \tau_j(x, y, z))$ is the TDOA for ith cooperator and jth reference.
$\tau_i(x, y, z)$ is the predicted TOA at the ith cooperator at position x, y, z
$\tau_j(x, y, z)$ is the predicted TOA at the jth reference at position x, y, z
$\hat{\tau}_{ij}$ is the measure TDOA for the ith cooperator and the jth reference Taking the derivative of (8) with respect to $B_j$, setting the result equal to zero and solving for $B_j$ gives $$B_j = \sum_{i=1}^{N_j} \Delta\tau_{ij} W_{ij}''' \Big/ \sum_{i=1}^{N_j} W_{ij}''' \qquad (9)$$

Substituting the $N_R$ bias solutions from (9) into (8) gives the decision metric that can then be used to compute the location solution decision using TDOA measurements with multiple references sources The computation of (8) is performed once the bias is computed as shown in FIG. 12. Even though the bias is estimated by assuming a TDOA error distribution that is Gaussian, any general distribution that requires a bias estimate may be used to compute the decision metric.

The figure shows an error, $E_{ij}$, being found followed by the application of an error distribution model given the position x, y, z. This may involve the use of a covariance matrix and/or other model parameters. The decision metric is updated for all reference sectors. Lastly, when all reference sectors have been considered, an a-priori position probability gets applied that is independent of the common bias in the TDOA measurements. The a-priori contribution may depend on other modeling parameters as shown.

H. Alternative Embodiments

1. Time of Arrival (TOA)

Figure 13A:
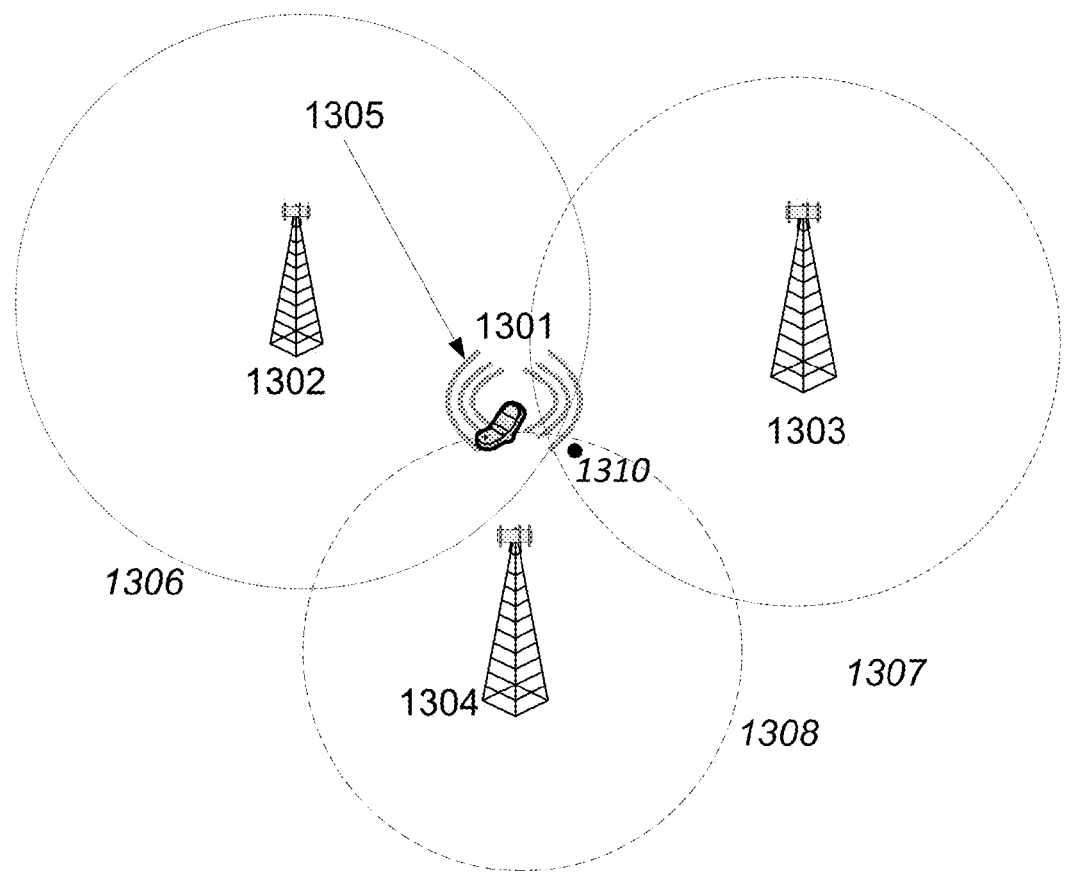
FIGS. 13a, 13b, 14a and 14b depict alternative embodiments.

FIG. 13a is used to illustrate the Time-of-Arrival method used in the present invention. In this example, three location receivers 1302 1303 1304, represented as cell towers, are used to locate a mobile 1301.

During a location attempt, the wireless location system via geographically distributed receivers collect uplink radio transmission signal 1305 from the mobile device 1301. The intersection (or closest approach) of three or more ranges 1306 1307 1308 is the calculated location 1310.

Many techniques for determining the TOA at a receiver exist. One example is the absolute time correlation method where an arbitrary radio transmission 1305 from the mobile device 1301 is collected at the receivers 1302 1303 1304 which are precisely timed relative to a time constant. The collected sample from the best receiver (highest signal to noise ratio) is then used to correlate against the other collected samples to determine the time offsets and thus the ranges used to determine location.

1.1 Time of Arrival Residuals

Figure 13B:
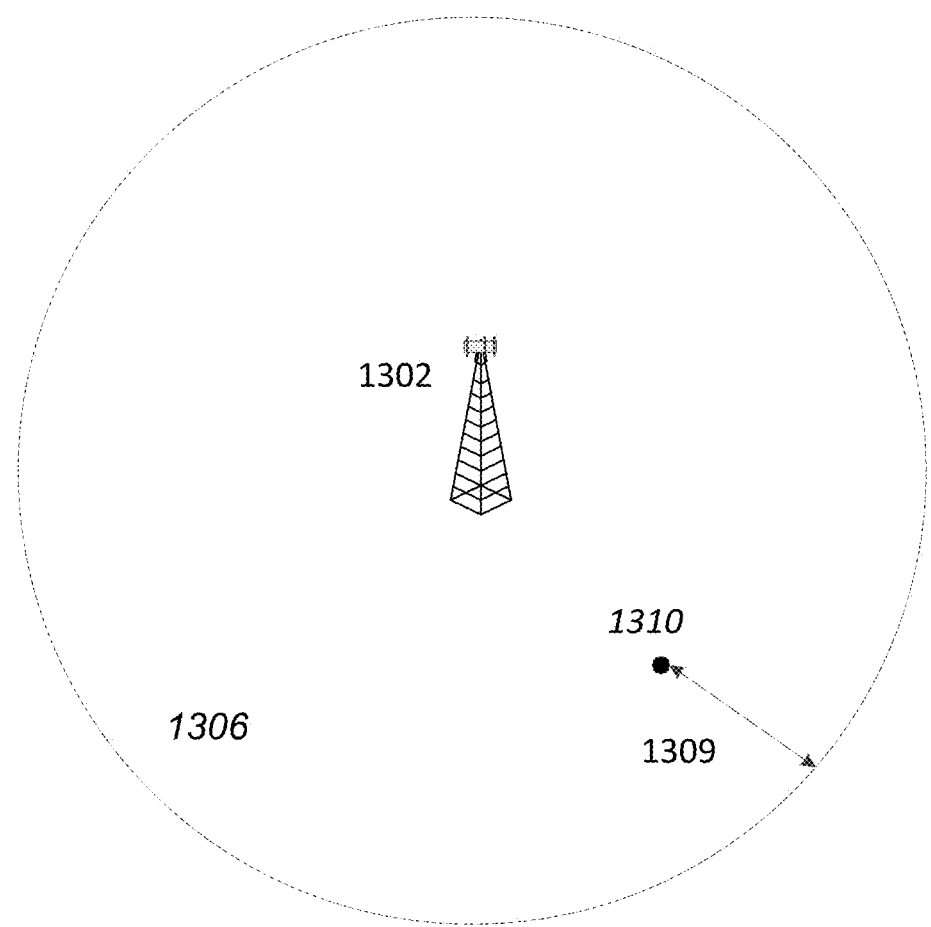

As in the TDOA example, a TOA residual value can be calculated for each range. FIG. 13*b* geographically depicts the determination of the residual value. The receiver 1302 is used, with other receivers, to calculate a range 1306 for the mobile device. A mobile device is estimated to be at a location 1310 from its received signal broadcast during one of a series of collection events. The absolute difference between the estimated range 1306 and the estimated location 1310 is the residual for the receiver 1302 and is stored for later combination with the results and residuals from other collection events.

2. Angle of Arrival (AOA)

Calculating the direct line-of-sight path from the transmitter to receiver, AOA (Angle of Arrival) provides location services in areas of sparse cell site density, or where cell sites are arranged linearly, for example, along a stretch of highway. A minimum of two AoA receivers is required to perform an AoA location. AoA receivers are typically deployed with a U-TDOA receivers to form a hybrid TDOA/AoA wireless location system.

FIG. 14*a*

Figure 14A:
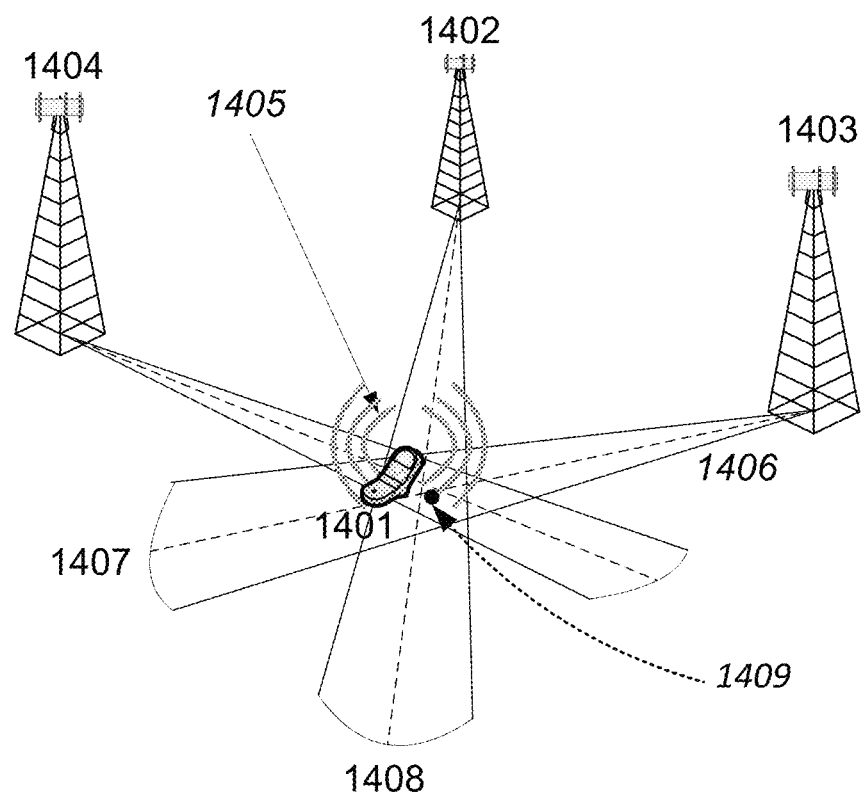
Figure 14B:
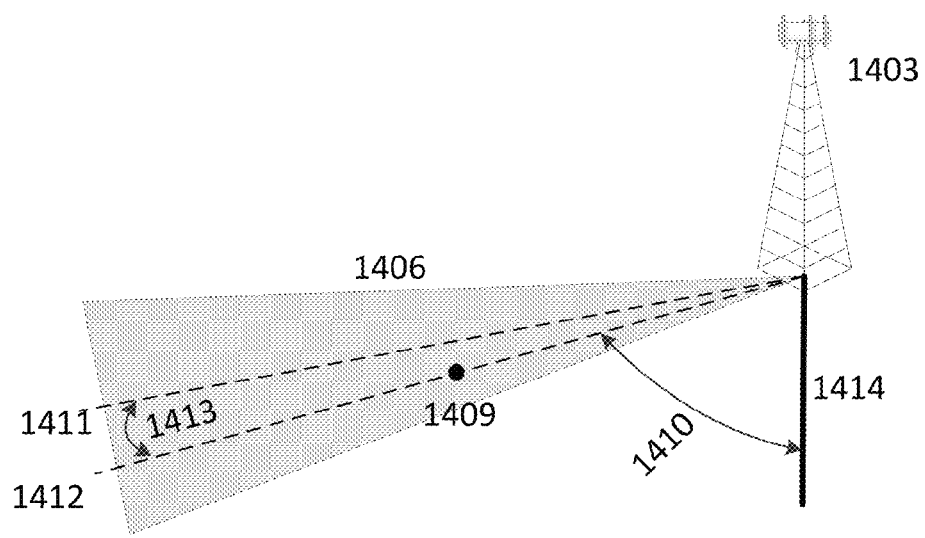

FIG. 14*a* shows the Angle of Arrival (AOA) technique. Like U-TDOA, AOA (Angle of Arrival) requires specialized receivers at or incorporated into the hardware and software of the wireless communication system's radio base stations 1402 1403 1404 and directional antenna arrays nominally attached on existing cell tower. Each AoA receiver uses an antenna containing a multiple element array in which the exact location of each element is known precisely. In this AoA example, a mobile device 1401 broadcasts a radio signal 1405. The three AoA receiver-equipped base stations 1402 1403 1404 measure radio signal strength, time of arrival, and phase at each element of the co-located array. From these measurements, the wireless location system can an estimate of the line-of-sight path from transmitter 1401 to each receiver 1402 1403 1404. The intersection point of the two line-of-sight paths represents the calculated location 1409 of the transmitting mobile phone.

FIG. 14*b*

Similar to the TDOA and TOA residual values, an Angle-of-Arrival (AoA) residual value can be calculated for an AoA or TDOA/AoA (or AoA with any other hybrid location technique). In the case of an AoA collection, the mobile's location 1401 is associated with a calculated ray 1411 with origin at a receiving LMU (in this illustration base station 1403 is equipped with an AoA LMU and a receiving antenna array). The directional receiver antenna associated with the LMU cover a geographic area 1406. To compute the Residual Angle value a revised ray 1412 is plotted to intersect with the calculated mobile device location 1409. The original computed ray 1411 at an angle of 1410 from North 1414 is then used with the revised ray 1411 to compute the error angle 1413. The RMS value of the error angle 1413 is then associated with the computed ray 1411 for later use in the final location calculation.

H. Conclusion

The true scope the present invention is not limited to the presently preferred or illustrative embodiments disclosed herein. For example, and moreover, the terminology used in the above written description is by no means intented to limit the scope of protection. The names used to refer to various computer-implemented procedures or algorithms, including CML (combine multiple locations), LA (location algorithm), CLA (combine locations algorithm), WA (weighting adjustment), RBA (redundant baseline analysis), etc., are intened to be merely descriptive and by no means limiting in any respect. Similarly, the mathematical formulae recited herein are descriptive of computational procedures that may be carried out in a variety of mathematically equivalent ways, and the invention is by no means limited to the specific mathematical formulae described herein. Accordingly, except as they may be expressly so limited, the scope of protection of the following claims is not intended to be limited to the specific embodiments described above.

What is claimed:

1. A method for combining multiple location measurements determined by a wireless location system, comprising:
    generating multiple single location measurements for a mobile device, wherein the single location measurements are generated using a location algorithm (LA) for estimating the location of the mobile device based on signals received from the mobile device and providing location measurements, wherein the location measurements are computed based on at least one of time difference of arrival (TDOA), time of arrival (TOA), and angle of arrival (AOA);
    using the LA, providing quality metrics (QM) for the location measurements; and
    executing a combined location algorithm (CLA) to compute an improved location estimate using the information obtained during the process of generating the multiple single location estimates, wherein the CLA includes a weighting adjustment (WA) procedure, a redundant baseline analysis (RBA) procedure, wherein the RBA procedure includes a reweighting and filtering operation, a procedure for selecting a search region using the location of cooperating sites and prior locations previously stored by the LA, and a joint bias analysis (JBA) procedure for computing a decision metric throughout the search region, and wherein weights are computed by the WA procedure using a quality metric and are reduced by the RBA procedure in accordance with a downweighting factor.

2. A method as recited in claim 1, wherein the multiple single location measurements are generated using a combine multiple locations (CML) procedure, and the method is initiated after the mobile device accesses a wireless communications network, and a location triggering platform provides a position request to a Serving Mobile Location Center (SMLC), the position request including tasking information regarding serving cell(s), channel assignment and related radio tuning information, and the SMLC makes a decision on engaging the CML procedure and the number of location measurements, duration of collection period for each measurement and scheduling of collection periods.

3. A method as recited in claim 1, wherein the multiple single location measurements are generated using a combine multiple locations (CML) procedure, and the CML procedure includes accessing a site measurements database to obtain data for cell site locations, sector configurations and antenna information, and wherein the LA employs initial TDOA measurements and correlation values, and wherein location information processed by the LA is stored in a location database for use by the CLA.

4. A method as recited in claim 3, wherein the location database includes information about improvements in the TDOA measurements, measurement weightings and a TDOA reference sector used to make a preliminary location measurement.

5. A method as recited in claim 1, wherein the quality metrics are stored in a QM database comprising a database record containing a computed location, computed velocity, confidence factor for the computer location, confidence factor for the computed velocity, number of baselines, TDOA residual value for each baseline, and frequency difference of arrival (FDOA) residual for each baseline.

6. A method for combining multiple location measurements determined by a wireless location system, comprising:
using a combine multiple locations (CML) procedure, generating multiple single location measurements for a mobile device, wherein the single location measurements are generated using a location algorithm (LA) for estimating the location of the mobile device based on signals received from the mobile device and providing location measurements, wherein the location measurements are computed based on at least one of time difference of arrival (TDOA), time of arrival (TOA), and angle of arrival (AOA);
using the LA, providing quality metrics (QM) for the location measurements; and
executing a combine locations algorithm (CLA) to compute an improved location estimate using the information obtained during the process of generating the multiple location estimates, wherein the CLA includes a weighting adjustment (WA) procedure and a redundant baseline analysis (RBA) procedure, wherein the RBA procedure includes a reweighting and filtering operation, and wherein weights are computed by the WA procedure using a quality metric and are reduced by the RBA procedure in accordance with a downweighting factor;
wherein the LA comprises the steps of:
processing input data, including measurement data and site information, during a prepare input data procedure during which modifications to the input data are stored in a database;
selecting a search region using the input data;
providing the search region to a decision metric and bias calculation procedure, wherein, using the decision metric and bias calculation procedure, a decision metric and bias are computed for a plurality of potential locations;
determining an optimal location measurement using the decision metrics; and
storing the optimal location measurement along with potentially modified weights for use by the CLA.

7. A method as recited in claim 6, wherein, during the prepare input data procedure, modifications to the input data include corrections to the TDOA measurements.

8. A method as recited in claim 6, wherein, during the prepare input data procedure, an initial weighting of each measurement is computed.

9. A method as recited in claim 6, wherein the decision metric and bias calculation procedure includes changing initial weightings to further improve location measurement accuracy.

10. A method as recited in claim 1, wherein the WA procedure uses an overall quality metric for a single location to provide additional weighting information for TDOA measurements used in the CLA.

11. A method as recited in claim 1, wherein the CLA determines an optimal combined location estimate from the decision metric computations.

12. A method as recited in claim 10, wherein prior to downweighting of redundant baselines, an additional weighting operation is performed using the overall quality metric.

13. A method as recited in claim 12, wherein the quality metric is used by the WA procedure to scale original weights in accordance with a deviation of the quality metric from a minimum quality metric, and wherein final weights are scaled to ensure that there is no change in the sum of the weights when compared with the original weights.

14. A method as recited in claim 13, wherein the WA procedure computes a total weighting of all measurements in accordance with the following formula:

$$S_W = \sum_{j=1}^{N_L} \sum_{i=1}^{N_j} W_{ij}$$

where,
$N_L$ is the number of locations
$N_j$ is the number of cooperators for the jth location
$W_{ij}$ is the weight of the ith measurement having reference j; and
wherein a modified weight is computed using the quality metric in accordance with the following formula:

$$W'_{ij} = W_{ij} \Delta Q_j,$$

where,
$\Delta Q_i \equiv Q_{max} - Q_i$, and
$Q_{max}$ is a maximum limit on the quality metric,
thereby providing a higher weight to locations with a larger quality metric.

15. A method as recited in claim 14, wherein the WA procedure computes a new scaled weight for final normalization as:

$$S'_W = \sum_{j=1}^{N_L} \sum_{i=1}^{N_j} W'_{ij}$$

and wherein the final weight is then scaled as $$W''_{ij} = \frac{S_W}{S'_W} W'_{ij}.$$

16. A method as recited in claim 10, wherein the RBA procedure comprises the application of early and late thresholds to empirically obtain a zero weighting point for redundant TDOA measurements, and the use of a correlation deviation window around a peak correlation to determine a leading edge TDOA.

17. A method as recited in claim 16, wherein, once a leading edge TDOA is found over a subset of baselines, the remaining baselines of the subset are downweighted to zero at predetermined early and late thresholds.

18. A method as recited in claim 17, wherein the RBA procedure further comprises grouping TDOA measurements associated with co-located antennae and determining optimal settings for the weightings, window of deviation around the peak correlation, and early and late thresholds.

19. A method as recited in claim 18, wherein the RBA procedure further comprises the following steps:
grouping of the TDOA measurements into co-location groups, wherein one co-location group is provided for all co-located sectors having a common reference sector; and
selecting a co-location group and determining a peak correlation value, $\tau_{peak}$, for the selected group.

20. A method as recited in claim 19, wherein the RBA procedure further comprises the following: for each sector in a geographical region, computing a downweighting factor and applying the downweighting factor to an existing weight, wherein a multi-part test is performed to determine if a low correlation condition exists or an early/late condition exits, the multi-part test including the following:
a first test detects low correlation ($\rho < \rho_{max} - \Delta\rho$), wherein, if the correlation is too low to be reliable relative to the peak correlation, then the measurement is filtered by setting a downweighting filter value, F, to zero;
a second test determines whether components of the current TDOA group are early or late based on the component with the peak correlation value.

21. A method as recited in claim 20, wherein late TDOA components are tested against a pre-set late threshold, wherein TDOA components determined to be too late ($\tau > \tau_{peak} + T_L$) are filtered out by setting the downweighting filter value, F, to zero, and wherein late TDOA components within the late threshold are filtered with F computed in accordance with the formula:

$$F = \left[\frac{F_L - 1}{T_L}(\tau - \tau_{peak}) + 1\right]^{P_L}$$

$$\tau_{peak} < \tau < \tau_{peak} + T_L$$

where F is the downweighting factor, $F_L$ is a late downweighting factor, $\tau_{peak}$ is the time associated with the highest correlation value, and $P_L$ is a shaping parameter that is greater than zero.

22. A method as recited in claim 21, wherein early components are tested against a pre-set early threshold, wherein TDOA components determined to be too early ($\tau < \tau_{peak} - T_E$) are filtered out by setting the downweighting filter value, F, to zero, and wherein early TDOA components within the early threshold are filtered with F computed in accordance with in accordance with the formula:

$$F = \left[\frac{1 - F_E}{T_E}(\tau - \tau_{peak}) + 1\right]^{P_E}$$

$$\tau_{peak} - T_E < \tau < \tau_{peak}$$

where F is the downweighting filter factor, $F_E$ is an early downweighting factor, $\tau_{peak}$ is the time associated with the highest correlation value, and $P_E$ is a shaping parameter that is greater than zero.

23. A method as recited in claim 22, wherein the RBA procedure independently uses both a set of early parameters ($F_E$, $T_E$, $P_E$) and late parameters ($F_L$, $T_L$, $P_L$).

24. A method as recited in claim 22, wherein for each sector in the co-location group, the scaling is applied to the existing weight for the ith TDOA measurement using the jth reference sector in accordance with the formula, $W''_{ij} = F W''_{ij}$, wherein if there is only a single location available, then the RBA procedure is performed and $W_{ij}$ is substituted for $W''_{ij}$.

25. A method as recited in claim 22, wherein the RBA procedure further checks for additional sectors in the current co-location group and, if additional sectors exist, then the procedure moves to a next sector, and if no additional sectors in the current co-location group exist, then the procedure checks for additional co-location groups.

26. A method as recited in claim 1, wherein the JBA procedure combines different TDOA measurements that have been generated using different reference measurements, and wherein the JBA procedure identifies and optimizes bias correction over all TDOA measurements.

27. A method as recited in claim 26, wherein the JBA procedure employs an analytical solution for a multidimensional minimization of a maximum likelihood location decision metric.

28. A method as recited in claim 27, wherein the JBA procedure comprises the following steps in the computation of the decision metric and bias at a geographic position x,y,z:
computing the bias prior to performing steps involved with the decision metric computation, wherein a contribution to the bias is computed over all reference sectors;
for multiple references, the bias is found by considering the decision metric that would be optimal for a Gaussian TDOA error distribution, wherein, with multiple references, the decision metric is computed in accordance with the formula:

$$M = \sum_{j=1}^{N_R} \sum_{i=1}^{N_j} (E_{ij})^2 W'''_{ij}$$

where,
$N_R$ is the number of reference sectors
$N_j$ is the number of cooperators using the jth reference sector
$E_{ij} \equiv \Delta\tau_{ij} - B_j$ is the error sample
$B_j$ is the bias for the jth reference sector
$\Delta\tau_{ij} \equiv \hat{\tau}_{ij} - (\tau_i(x,y,z) - \tau_j(x,y,z))$ is the TDOA for ith cooperator and jth reference
$\tau_i(x,y,z)$ is the predicted TOA at the ith cooperator at position x,y,z
$\tau_j(x,y,z)$ is the predicted TOA at the jth reference at position x,y,z
$\hat{\tau}_{ij}$ is the measured TDOA for the ith cooperator and the jth reference.

29. A method as recited in claim 28, wherein the JBA procedure further comprises:
computing a derivative of the decision metric, M, with respect to $B_j$, and setting the result equal to zero and solving for $B_j$ in accordance with the formula:

$$B_j = \sum_{i=1}^{N_j} \Delta\tau_{ij} W'''_{ij} \bigg/ \sum_{i=1}^{N_j} W'''_{ij}$$

and then substituting the $N_R$ bias solutions to determine the decision metric that can then be used to compute the location solution decision using TDOA measurements with multiple references.

* * * * *